United States Patent [19]
Murphy

[11] Patent Number: 5,995,043
[45] Date of Patent: Nov. 30, 1999

[54] AIRCRAFT SATELLITE NAVIGATION PRECISION-APPROACH SYSTEM INCLUDING CDMA DATALINK

[75] Inventor: Timothy Allen Murphy, Lynnwood, Wash.

[73] Assignee: The Boeing Company, Seattle, Wash.

[21] Appl. No.: 08/761,432

[22] Filed: Dec. 6, 1996

[51] Int. Cl.⁶ .............................. H04B 7/185; G01S 5/02
[52] U.S. Cl. .............................. 342/357.03; 342/357.04; 701/215
[58] Field of Search ................... 342/357, 357.03, 342/357.04; 701/215

[56] References Cited

U.S. PATENT DOCUMENTS

| | | |
|---|---|---|
| 4,117,267 | 9/1978 | Haberle et al. |
| 4,630,283 | 12/1986 | Schiff. |
| 4,751,512 | 6/1988 | Longaker. |
| 5,099,245 | 3/1992 | Sagey. |
| 5,402,442 | 3/1995 | Ishigaki. |
| 5,420,883 | 5/1995 | Swensen et al. |
| 5,440,544 | 8/1995 | Zinser, Jr. |
| 5,572,216 | 11/1996 | Weinberg et al. ............... 342/357 |
| 5,714,948 | 2/1998 | Farmakis et al. ............... 340/961 |
| 5,815,525 | 9/1998 | Smith et al. ............... 375/200 |

OTHER PUBLICATIONS

Pickholtz, R.L., "Theory of Spread-Spectrum Communications-A Tutorial", *IEEE Transactions on Communication*, vol. COM-30, No. 5, 855-884, May, 1982.

*Primary Examiner*—Theodore M. Blum
*Attorney, Agent, or Firm*—Christensen, O'Connor, Johnson & Kindness PLLC

[57] ABSTRACT

An aircraft local area augmented landing assistance system that employs a differential global positioning system (GPS) to assist aircraft (102) landing is disclosed. One or more GPS ground stations (120), each including at least one GPS receiver (122) and a datalink transmitter (126), calculate and transmit GPS correction data to an aircraft (102). An aircraft (102) employs a GPS receiver (106) for receiving ranging signals (112) from GPS satellites (108), and a datalink receiver (116) for receiving GPS correction data from a GPS ground station (120). The ground station datalink transmitter (126) employs code division multiple access spread spectrum techniques to transmit a datalink signal (128) that is QPSK modulated within the VHF navigation band. The datalink signal (128) is additionally used as a ranging signal by the aircraft, to augment the differential GPS.

19 Claims, 3 Drawing Sheets

AIRCRAFT SATELLITE NAVIGATION PRECISION-APPROACH SYSTEM INCLUDING CDMA DATALINK

FIELD OF THE INVENTION

The present invention relates to aircraft instrument navigation systems and, more particularly, to aircraft instrument navigation systems that assist the navigation of an aircraft during approach and landing.

BACKGROUND OF THE INVENTION

Modern aircraft employ landing navigation systems to assist a pilot in maintaining an aircraft along a predetermined glide path associated with a particular landing strip or runway. Commercial aircraft commonly incorporate an Instrument Landing System (ILS) or a Microwave Landing System (MLS). ILS systems suffer from several problems, including RF interference from nearby FM broadcasting stations and guidance beam distortions due to increased development in airport environs. Economic concerns have limited the acceptance of MLS systems.

A Global Positioning System (GPS) employs spaced-apart satellites in circular orbits at locations that are readily available to the public. One reference for satellite information is the Interavia Space Directory (1990-1991), available from James Information Group, which contains the nominal orbital locations of GPS satellites. GPS satellites continuously broadcast signals that may be received by anyone with the proper equipment. The GPS satellite signals contain ephemeris data that precisely describes the orbits of the satellites. A GPS operates on the principle of multilateration, wherein a GPS receiver makes range measurements based on the GPS signals generated by multiple satellites. The range from a satellite is determined by measuring the satellite signal transmission and receiving time in conjunction with a clock synchronized to the satellite's clock, and calculating the distance from a specified position of the satellite at the transmission time. The specified satellite position is obtained from the broadcast ephemeris data. The intersection of the multiple range measurements made simultaneously is used to ascertain latitude, longitude, and altitude. Range measurements from at least three sources are necessary to ascertain a position in three-dimensional space.

Each range measurement contains an error called an offset bias, created by the unsynchronized operation of the satellite and user clocks. This error will yield an erroneous range measurement, making it appear that the user is either closer to or farther from each of the satellites, as compared with the true distance. These measurements are therefore more accurately termed pseudoranges.

An additional error is introduced by the content of the GPS satellite transmission itself. Each GPS satellite transmits an encrypted signal for military use and a degraded, unencrypted signal for civilian use. The unencrypted signal used by commercial aircraft may introduce errors from zero meters to 100 meters or more. Physical factors also introduce uncertainty in range calculations. Atmospheric propagation delays and multipath interference are two such major factors.

One technique for reducing the effects of the error in a GPS utilizes differential corrections for the pseudoranges measured by a GPS receiver to eliminate common errors, namely, offset biases. Differential corrections can be determined by placing a GPS ground station receiver at a precisely known, fixed reference site, and determining pseudoranges to GPS satellites. Actual errors are then determined by comparing the calculated pseudoranges with the values expected for the known reference site. The differences between the received and expected values are then transmitted to the GPS receiver over a separate datalink to enable the receiver to correct pseudorange measurements before the position of the receiver is computed.

A fixed differential GPS (DGPS) ground station used in an aircraft landing environment typically includes a datalink signal transmitter for transmitting GPS correction data and approach data associated with a particular landing strip. Approach data includes the identity of the approach and coordinates that sufficiently describe the desired flight path for the approach to the landing strip.

Current systems offering DGPS for private use and commercial aircraft are built to a Requirements and Technical Consideration for Aeronautics (RTCA) standard known as "Special Category I" (SCAT I), which is documented in RTCA document DO-217. The SCAT I system uses a datalink situated in the VHF navigation band (112 to 118 MHz). The physical layer uses a differentially encoded eight-phase shift keyed (D8PSK) waveform. The media access sublayer uses time division multiple access (TDMA) with a slot structure maintained by synchronization with GPS time.

One shortcoming of SCAT I is that it lacks precisely specified performance standards of interfaces necessary to support interoperability. This makes it difficult for avionics manufacturers to build equipment to a standard such that the equipment will work with any ground station equipment. Another shortcoming of the SCAT I system is the relatively crowded nature of the VHF navigation band. In some areas of the world, this band is heavily used. Additional frequencies may not be available within the VHF navigation band for use in a DGPS. Thus, a need exists for an improved method of transmitting datalink signals to an aircraft, while minimizing interference caused by heavy use of the VHF navigation band.

DGPSs that use of one or more pseudolites to augment satellite GPSs have been proposed for implementation in aircraft landing systems. A pseudolite consists of a ground-based station with a transmitter that transmits signals similar to those transmitted by a GPS satellite. An aircraft can combine the range measurements calculated from pseudolite signals with satellite range measurements to further reduce errors. The use of a pseudolite in addition to a differential ground station increases the costs of building and maintaining a DGPS system. In summary, a need exists for an improved, economical method of providing range measurements to an aircraft during landing. This invention is directed to fulfilling this need.

SUMMARY OF THE INVENTION

In accordance with this invention, a landing assistance system that uses GPS satellite signals and local-area augmentation to assist the navigation of an aircraft during approach and landing and a related method are provided. The preferred form of the local-area augmented landing assistance system utilizes a network of Global Positioning System (GPS) satellites spaced apart in circular orbits about the earth, and includes one or more GPS ground stations positioned at fixed locations on the ground near a landing area, communicating with aircraft flying above the earth. The GPS satellites transmit ranging signals, which are used to determine the range of the aircraft and the ground stations from the selected satellites. The GPS ground station(s) includes one or more receivers for receiving the GPS satellite ranging signals, a data processor, and a transmitter for transmitting datalink signals containing correction information to the aircraft. The GPS ground station receivers measure a pseudorange to each satellite, and determine the error associated with the pseudoranges as the deviation between the pseudoranges and the known distance between the satellites and the ground station receivers. A datalink signal containing the error information is transmitted to the aircraft, to be used by the aircraft in correcting the aircraft's own pseudoranges to each GPS satellite. The datalink signal is a code division multiple access (CDMA) spread spectrum signal within the VHF navigation band.

In accordance with other aspects of this invention, the datalink signal maintains a frequency within the range of approximately 108 MHz to approximately 118 MHz, utilizing a code rate of approximately 10 MHz. Quadrature phase shift keying (QPSK) is used to modulate the datalink signal with a pseudorandom code.

In accordance with still other aspects of this invention, the datalink signal contains a datalink message that is bipolar phase modulated at a low frequency. The frequency is preferably 5 kHz.

In accordance with yet still other aspects of this invention, the datalink signal functions as a ranging signal. A receiver on the aircraft uses the datalink signal to determine a range between the aircraft receiver and the GPS ground station transmitter.

As will be readily appreciated from the foregoing description, a local-area augmented landing assistance system formed in accordance with the invention provides differential GPS correction information to an aircraft during landing. The invention minimizes vulnerability to interference by signals within the VHF navigation band without requiring any additional reserved frequency for the datalink signal. In essence, the invention uses spread spectrum communication to reject interference. In spread spectrum communications, a signal occupies a bandwidth in excess of the minimum necessary to send the information. The additional bandwidth allows the signal to include a code that is independent of the data. A receiver synchronized with the code despreads the data signal. Because the invention utilizes existing VHF aircraft antennas, the costs of retrofitting an aircraft is lower than it would be for an entirely new system operating outside the VHF band.

In addition, the invention provides a ranging signal that is used by an aircraft to determine a pseudorange. The aircraft uses the resultant pseudorange in conjunction with pseudoranges determined from satellites, thereby improving the accuracy of the aircraft's ascertained position. By providing a ranging signal in conjunction with a datalink signal from a single ground station, the invention is more economical than a system that uses a pseudolite separate from a differential ground station.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Figure 1:
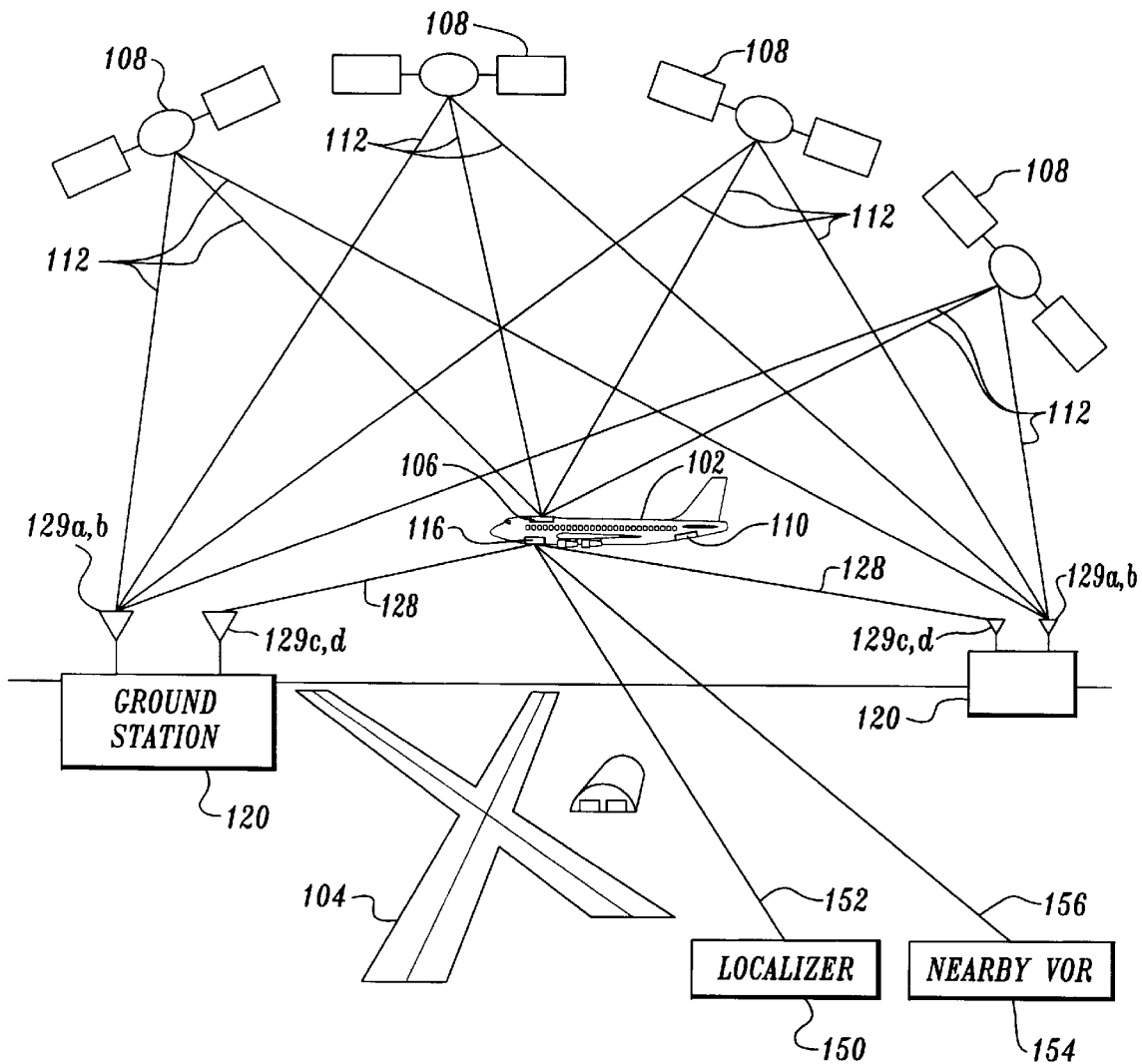
FIG. 1 is a pictorial diagram illustrating a local-area augmented landing assistance system according to the invention.

FIG. 1 is a pictorial diagram illustrating the major components of a preferred embodiment of a local-area augmented landing assistance system formed in accordance with the invention in combination with an aircraft 102, shown flying above the surface of the earth near a runway 104, and a plurality of GPS satellites 108 located in orbit above the earth. The system comprises one or more GPS ground stations 120 located on the ground, and generally positioned in proximity to an airport.

The GPS satellites 108 are positioned and spaced apart so that the aircraft 102 flying at any position above the earth is in direct line of sight of at least four GPS satellites 108. The GPS satellites 108 transmit GPS ranging signals 112, the ranging signals 112 being available for reception by both the aircraft 102 and the GPS ground station(s) 120. A constellation of GPS satellites 108 refers to the subset of satellites 108 that are capable of having their ranging signals 112 received by the aircraft 102 and the GPS ground station(s) 120 at a given time. Thus, the four GPS satellites 108 shown in FIG. 1 make up the relevant satellite constellation for the illustrated aircraft 102.

Figure 2:
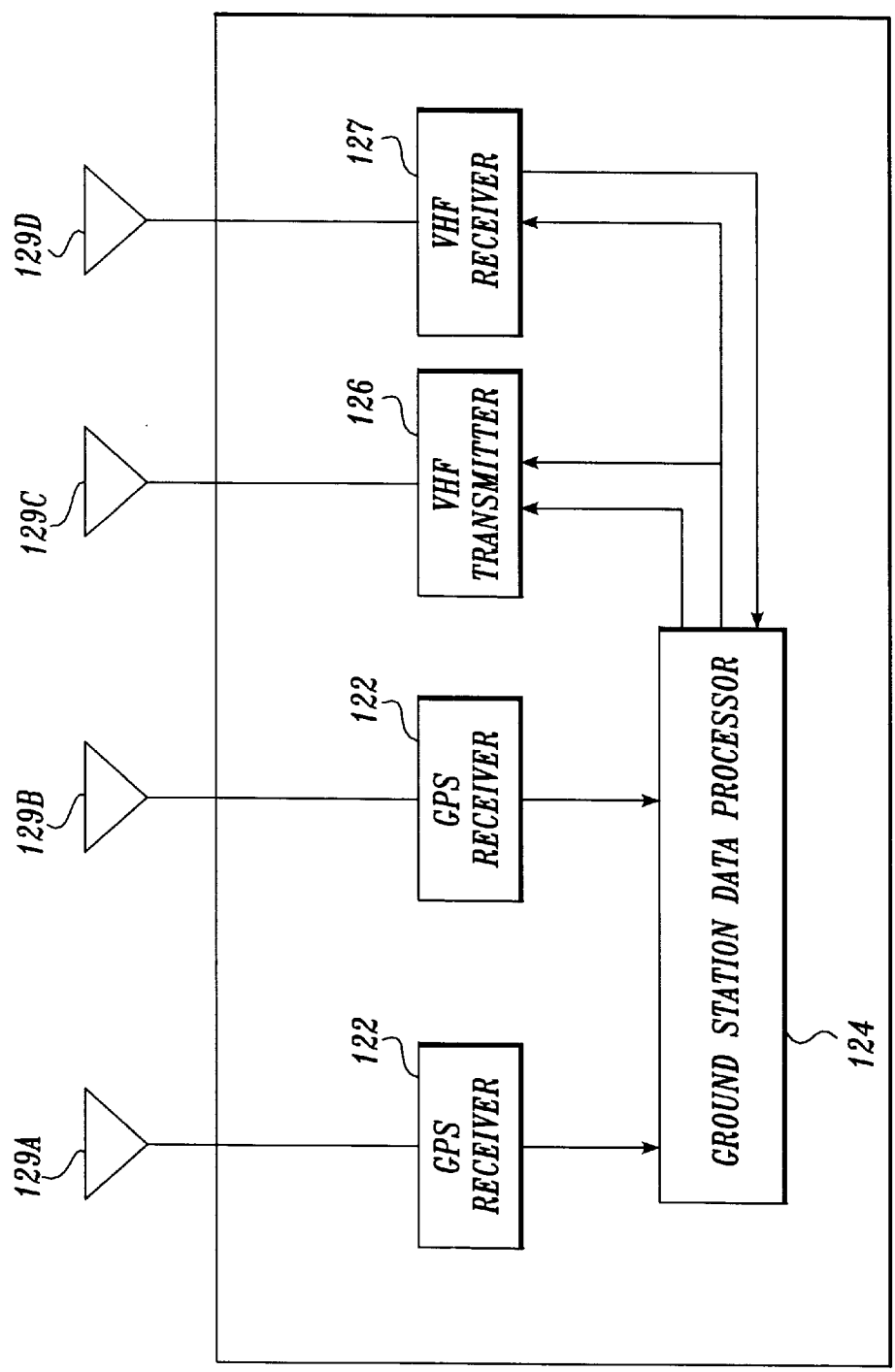
FIG. 2 is a block diagram of a GPS ground station formed in accordance with the invention suitable for use in FIG. 1 for receiving and processing GPS satellite signals and transmitting datalink signals to an aircraft.

The GPS ground stations 120 are located at a fixed position on the ground. As shown in FIG. 2, each GPS ground station 120 includes one or more GPS receivers 122 operative for receiving the satellite ranging signals 112 transmitted by the GPS satellites 108. Each GPS ground station 120 further includes: a ground station data processor 124 operative for processing received satellite ranging signals 112; a VHF transmitter 126 for transmitting a datalink signal 128 to the aircraft 102; and a VHF receiver 127 for receiving a datalink signal 128 from the (i) VHF transmitter 126, and (ii) the VHF transmitters of other ground stations 120. The GPS receivers 122, the VHF transmitter 126, and the VHF receiver 127 are connected to suitable antennae 129a, 129b, 129c, and 129d.

FIG. 1 also includes a localizer 150, operative for transmitting a directional radio beacon 152 to provide aircraft 102 with signals for lateral guidance with respect to the runway centerline. A VOR (VHF Omni Range) transmitter 154 in the vicinity of the runway transmits VHF omnidirectional signals 156 to the aircraft. The localizer 150 and VOR 154 are not part of the present invention, but are included in FIG. 1 to illustrate the environment within which the invention operates, an environment including competitive signals within the VHF navigation band.

Referring to FIG. 1, the aircraft 102 carries a global positioning system (GPS) receiver 106 (represented by a block for convenience of illustration) capable of receiving ranging signals 112 from the GPS navigation satellites 108. The aircraft 102 further includes a data processor 110 (also represented by a block) operative for processing received GPS satellite signals 112. The aircraft 102 further includes a datalink receiver 116 operative for receiving the datalink signal 128 from the GPS ground stations 120. As explained in more detail below, the aircraft data processor 110 combines the information received from the GPS ground stations 120 with the ranging data confirmed in the GPS satellite signals 112 to determine the position of the aircraft 102.

Since the operation of a GPS in an aircraft environment is well known in the art, the details of such systems are not described here. Briefly, each of the GPS satellites 108 transmits a ranging signal 112 consisting of a coded signal that originates from the satellite at a specific moment in time. The aircraft's GPS receiver 106 receives the coded signal and determines the time of reception. The aircraft's data processor 110 determines the distance between each GPS satellite 108 and the GPS receiver 106 located on an aircraft 102 by measuring the ranging signal transmission and reception time in conjunction with a clock (not shown) located onboard the aircraft, and multiplying by the propagation speed of the ranging signal 112. The resultant measurements are commonly referred to as pseudoranges, due to the inherent offset between the satellite clock and the user clock, and the degree of uncertainty resulting from the introduction of errors as discussed in the Background of the Invention. Determining pseudoranges from at least four GPS satellites 108, and using knowledge of the satellites' locations, allows the aircraft data processor 110 to use multilateration to determine the time offset between the satellite clock and the user clock, and determine the position of the GPS receiver 106, and therefore the aircraft 102, relative to the earth.

The operation of a differential GPS (DGPS) is also well known in the art. Briefly, as illustrated in FIG. 2, a GPS ground station includes a receiver 122 having one or more antennas 129a, 129b placed at a precisely known, fixed reference site. The GPS ground station receiver 122 calculates pseudoranges to one or more GPS satellites 108 (FIG. 1). An error is determined for each pseudorange by determining the differences between the pseudorange and the actual range, the actual range being determinable from the known position of the GPS ground station antenna 129a or 129b and the GPS satellite 108. The errors, or differential corrections, are transmitted to the aircraft 102, which uses the error data to correct the aircraft's pseudoranges to the identical satellites 108. A local-area augmentation system for satellite navigation precision approach of the type shown in FIG. 1 is described in more detail in copending patent application Ser. No. 08/720,715 filed on Oct. 2, 1996, the subject matter of which is incorporated herein by reference.

As illustrated in FIG. 2, and described above, each ground station 120 preferably comprises at least two GPS receivers 122, a ground station data processor 124, one VHF transmitter 126, and one VHF receiver 127. The VHF transmitter 126 transmits the datalink signal 128 (FIG. 1) to the aircraft 102. The VHF receiver 127 receives the datalink signal 128 transmitted by the related ground station 120 and by other nearby ground stations 120.

As illustrated in FIG. 1, the receivers 122 (FIG. 2) of the GPS ground stations 120 receive GPS ranging signals 112 from the GPS satellites 108. The ground station 120 is programmed with a priori information regarding the position of the ground station receiver antennas 129a and 129b. Knowing the true position of the ground station receiver antennas 129a and 129b, the ground station 120 can compute the range between the ground station receiver antenna and the indicated position of the satellite 108 as derived from the ephemeris data contained within the navigation message broadcast by the satellites 108. This computed range is then subtracted from the measured pseudorange for each satellite 108 to form a pseudorange correction. This information is included in the ground station messages transmitted through datalink signals 128 to the aircraft 102. The aircraft data processor 110 subsequently uses the pseudorange correction to adjust its measured pseudoranges. The corrected pseudoranges are then used in the calculation of the position of the aircraft 102.

In accordance with the invention, the GPS ground station 120 transmits the datalink signal 128 at a preferred fixed frequency of 113 MHz. The signal is QPSK modulated with a pseudorandom code, thereby producing a code division multiple access (CDMA) spread spectrum signal. Preferably, a code rate of 10 MHz is utilized to produce a spread spectrum signal having a main spectral lobe extending from 108 MHz to 118 MHz. The signal also contains a datalink message that is BPSK modulated at a low frequency, preferably 5 kHz. The carrier and the original signal are both modulated to produce the datalink message.

The CDMA datalink signal 128 as described coexists with the ILS and VOR signals in the band by virtue of the spectrum spreading inherent in the pseudorandom noise code modulation. The power in the datalink signal is spread over the entire 10 MHz band. Therefore the power spectral density is reduced by a factor calculated as:

$$10\log(10,000,000) = 70\text{dB} \qquad (1)$$

Conversely, when the airborne VHF datalink receiver 127 is despreading the signal, the spread spectrum processing gain is applied against the VOR and ILS localizer signals received. If the basic spread spectrum processing gain is not enough to eliminate the signals, adaptive notch filters can be employed at the datalink receiver 127 to remove some number of particularly strong signals.

In addition to providing datalink messages, the spread spectrum datalink signal 128 functions as a ranging signal that is tracked in a manner similar to the tracking of GPS satellite ranging signals 112 to provide the aircraft 102 with additional range measurements. The additional range measurements obtained by the use of datalink signals 128 as ranging signals are combined with the range measurements obtained from the GPS satellite ranging signals 112 to more accurately determine the position of the aircraft 102, or to allow a determination of position with less than four satellites 108. Furthermore, the carrier phase can be tracked. The VHF carrier has a wavelength of source of 2.6548 meters. When combined with the carrier phase observables obtained from the GPS satellites 108, ambiguous solutions are separated by at least 2.7 meters. The basic search volume is limited by the basic differential code phase position solution. Very few ambiguous solutions can exist inside the search volume.

The table below contains a preferred power link budget for one embodiment of the above-described invention. According to this power link budget, a 20 nm datalink can easily be closed with a 100 mW transmitter. Also, the datalink signal does not introduce unacceptably large interference into the VHF receiver 127 tracking a distant VOR. The preferred desired to undesired ratio for a low power VOR signal is 34.4 dB.

| | | |
|---|---|---|
| Transmit Power | 100 | mW |
| Transmit Power | 20 | dBm |
| Cable Loss | −1 | dB |
| Antenna Gain - Ground | −3 | dBic |
| Distance | 20 | nm |
| Frequency | 113 | MHz |
| Wavelength | 2.65 | meters |
| Free-Space Path Loss | 104.9 | dB |
| Excess Path Loss | 0 | dB |
| Antenna Gain - Airborne | −8 | dBic |
| Polarization Loss | −3 | dB |
| Cable Loss - Airborne | −1.5 | dB |
| Received Power (CDMA signal) | −101.4 | dBm |
| Spread Bandwidth | 10 | MHz |

-continued

| | | |
|---|---|---|
| Spread power density | −171.4 | dBm/Hz |
| Interference Power into 100 kHz | −121.4 | dBm |
| Minimum VOR signal | −87.0 | dBm |
| VOR Desired to Undesired | 34.4 | dB |
| System Noise Temperature | 18297.8 | K |
| System Noise Figure | 18 | dB |
| Thermal Noise | 18503.1 | K |
| kTsys | −185.93 | dBW/Hz |
| Received C/No | 84.55 | dB-Hz |
| Required C/No (Tracking sigma = 1 meter) | 26.33 | |
| Required C/No (Data Demod) | 42.0 | dB-Hz |
| Margin | 58.2 | dB |
| Maximum VOR signal | −51.0 | dBm |
| Post Correlator Interference | −121.0 | dBm/Hz |
| Eq Number of VOR signals | 20.0 | |
| Received C/(No+Io) | 51.9 | dB-Hz |
| Margin with Interferor for Datalink | 10.0 | dB |

Figure 3:
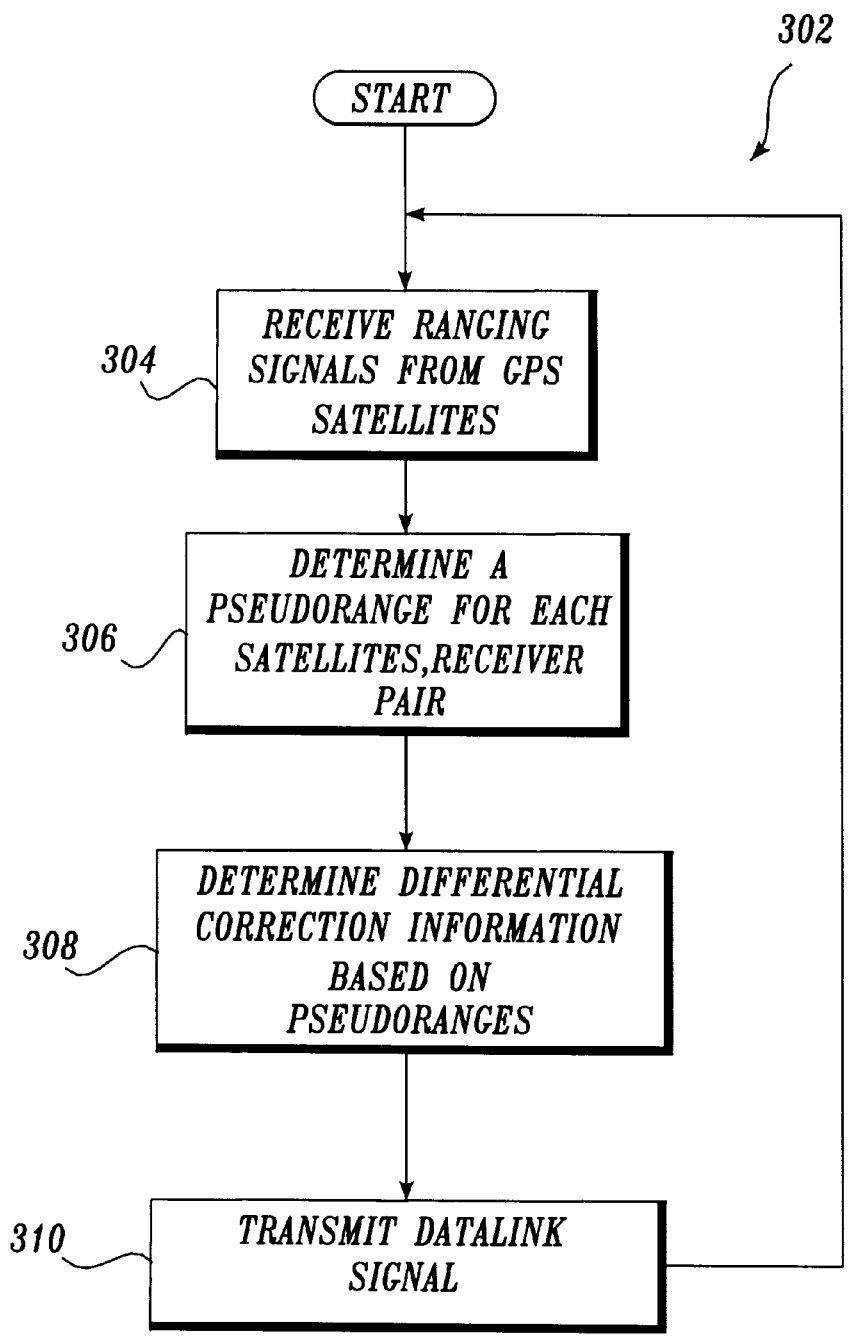
FIG. 3 is a flow diagram illustrating the process employed in the system shown in FIG. 1 for determining differential correction information and transmitting a datalink signal.

FIG. 3 illustrates the process 302 of determining differential correction information and transmitting the correction information to an aircraft. The process is discussed with reference to FIG. 1. At step 304, a VHF receiver 127 located at a GPS ground station 120 receives satellite ranging signals 112 transmitted by the GPS satellites 108. At step 306, a pseudorange is determined for each VHF receiver 127, GPS satellite 108 pair. At step 308, the ground station data processor 124 (FIG. 2) determines differential correction information based on the pseudoranges. A method of determining differential correction information is disclosed in copending patent application Ser. No. 08/720,715, more fully referenced above. At step 310, the VHF transmitter 126 transmits a datalink signal 128 containing the differential correction information. The datalink signal is transmitted as a CDMA spread spectrum signal as described above. After transmitting the datalink signal at step 310, the process of determining and transmitting differential correction information 302 loops back to step 304, receiving new ranging signals, and repeating the process indefinitely.

The invention as described above provides several advantages. Resolution of integer ambiguities is nearly instantaneous and can be performed with only four satellites in view. Robust integer ambiguity resolution allows for reliable carrier phase tracking. Therefore, the system will operate at lower vertical dilutions of precision (VDOP). Hence, the overall availability of the service is high. The datalink 128 as described is capable of employing low rate convolutional error correction codes without requiring extra bandwidth. This provides for a robust datalink at relatively low power.

Another significant advantage of the invention is that frequency management in the 108 MHz to 118 MHz band is simplified. When employing the invention, it is not necessary to find unused frequencies for DGPS datalink assignments. Rather, spectrum management becomes a management of noise.

While the preferred embodiment of the invention has been illustrated and described, it will be apparent that various changes can be made therein without departing from the spirit and scope of the inventions defined by the appended claims.

The embodiments of the invention in which an exclusive property or privilege is claimed are defined as follows:

1. A landing assistance system for providing navigation information to an aircraft, said landing assistance system including:
   (a) a plurality of satellites transmitting GPS ranging signals containing satellite data sufficient to determine an approximate range between said aircraft and each satellite; and
   (b) at least one GPS ground station positioned at a fixed location on the ground, said GPS ground station including:
      (i) at least one receiver operative for receiving said satellite GPS ranging signals and determining pseudoranges to said satellites;
      (ii) at least one data processor operative for determining differential correction information; and
      (iii) a datalink transmitter operative for transmitting a datalink signal containing said differential correction information, wherein said datalink signal is a code division multiple access (CDMA) spread spectrum signal within the VHF navigation band, and wherein said datalink signal contains ranging information sufficient to determine the range between said aircraft and said at least one GPS ground station.

2. The landing assistance system of claim 1, wherein the frequency of said datalink signal lies within the range of approximately 108 MHz to approximately 118 MHz.

3. The landing assistance system of claim 2, wherein the code rate of said datalink signal is approximately 10 MHz.

4. The landing assistance system of claim 3, wherein said datalink signal is QPSK modulated with a pseudorandom code.

5. The landing assistance system of claim 2, wherein said datalink signal is QPSK modulated with a pseudorandom code.

6. The landing assistance system of claim 2, wherein said datalink signal further contains a datalink message that is bipolar phase modulated at a low frequency.

7. The landing assistance system of claim 1, further including a VHF receiver located on the aircraft for receiving the datalink signals transmitted from said GPS ground station and utilizing said ranging information contained within said datalink signal to determine the range between said aircraft VHF receiver and said GPS ground station transmitter.

8. A method of automatically providing navigational assistance data to an aircraft for use in a differential global positioning system employing multiple GPS satellites and at least one GPS ground station having at least one GPS receiver, the method comprising:
   (a) receiving GPS ranging signals from at least two GPS satellites;
   (b) determining a unique pseudorange between said ground station GPS receiver and each of said GPS satellites;
   (c) determining differential correction information based on said pseudoranges; and
   (d) transmitting a datalink signal containing said differential correction data, said datalink signal comprising a code division multiple access spread spectrum signal within the VHF navigation band and containing ranging information sufficient to determine another pseudoranae between said GPS ground station and an aircraft VHF receiver.

9. The method of claim 8, wherein the frequency of said datalink signal lies within a frequency range of approximately 108 MHz to approximately 118 MHz.

10. The method of claim 9, wherein said datalink signal is QPSK modulated with a pseudorandom code.

11. The method of claim 8, wherein the code rate of said datalink transmitter is approximately 10 MHz.

12. The method of claim 8, wherein said datalink signal is QPSK modulated with a pseudorandom code.

13. The method of claim 8 wherein said method further comprises said aircraft utilizing said datalink signal to determine a pseudorange between said ground station and said aircraft VHF receiver.

14. In a differential global positioning system comprising a plurality of satellites transmitting ranging signals, at least one GPS ground station having a transmitter operative for transmitting datalink signals containing differential correction data, an aircraft having a receiver operative for receiving said datalink signals, the improvement comprising said datalink signal taking the form of a code division multiple access spread spectrum signal within the VHF navigation band.

15. The improvement of claim 14, wherein the frequency of said datalink signal lies within a frequency range of approximately 108 MHz to approximately 118 MHz.

16. The improvement of claim 15, wherein said datalink signal is QPSK modulated with a pseudorandom code.

17. A landing assistance system for providing navigation information to an aircraft using satellite GPS ranging signals transmitted by satellites orbiting the earth, said landing assistance system comprising:

(a) a ground station positioned at a known global location, the ground station including:
   (i) a ground station receiver for receiving satellite GPS ranging signal transmitted by selected ones of said satellites, the satellite GPS ranging signals containing information sufficient to determine pseudoranges between said selected ones of said satellites and the ground station;
   (ii) a ground station data processor for using the information sufficient to determine the pseudoranges between the selected ones of said satellites and the ground station contained in the satellite GPS ranging signals and the known global location of the ground station to determine differential corrections between the selected ones of said satellites and said ground station; and
   (iii) a ground station transmitter for transmitting a datalink signal including said differential corrections, the datalink signal further including carrier phase information sufficient to determine a pseudorange between the ground station and an aircraft receiving the datalink signal, the datalink signal being a code division multiple access spread spectrum signal within the VHF navigation band; and (b) an aircraft, including:
   (i) a GPS receiver for receiving satellite GPS ranging signals from said selected ones of said satellites, the satellite GPS ranging signals containing information sufficient to determine pseudoranges between said selected ones of said satellites and the aircraft;
   (ii) a datalink receiver for receiving the datalink signal; and
   (iii) a data processor for using the information sufficient to determine the pseudoranges between the selected ones of said satellites and the aircraft contained in the satellite GPS ranging signals and the differential corrections contained in the datalink signal to correct the pseudoranges between the selected ones of said satellites and the aircraft determined from the information contained in the satellite GPS ranging signals, the data processor being configured to combine the carrier phase information with the satellite GPS ranging signals to determine the position of the aircraft.

18. The landing assistance system of claim 17, wherein the datalink signal is QPSK modulated with a pseudorandom code.

19. The landing assistance system of claim 17, wherein a code rate associated with the code division multiple access spread spectrum signal is approximately 10 MHz.

* * * * *

UNITED STATES PATENT AND TRADEMARK OFFICE
CERTIFICATE OF CORRECTION

PATENT NO. : 5,995,043
DATED : November 30, 1999
INVENTOR(S) : T.A. Murphy

It is certified that error appears in the above-identified patent and that said Letters Patent is hereby corrected as shown below:

| COLUMN | LINE | |
|---|---|---|
| 8 (Claim 8, | 54-55 line 18) | "pseudoranae" should read --pseudorange-- |
| 9 (Claim 17, | 24 line 8) | "signal" should read --signals-- |

Signed and Sealed this

Twenty-fourth Day of April, 2001

Attest:

NICHOLAS P. GODICI

Attesting Officer     Acting Director of the United States Patent and Trademark Office